US007365462B2

(12) United States Patent
Sakakibara

(10) Patent No.: US 7,365,462 B2
(45) Date of Patent: Apr. 29, 2008

(54) ALTERNATOR DIRECTLY CONNECTED TO ENGINE

(75) Inventor: Hiroshi Sakakibara, Chita-gun (JP)

(73) Assignee: Denso Corporation, Kariya (JP)

( * ) Notice: Subject to any disclaimer, the term of this patent is extended or adjusted under 35 U.S.C. 154(b) by 351 days.

(21) Appl. No.: 11/199,186

(22) Filed: Aug. 9, 2005

(65) Prior Publication Data

US 2006/0097593 A1    May 11, 2006

(30) Foreign Application Priority Data

Nov. 10, 2004    (JP)    .............................. 2004-326064

(51) Int. Cl.
*H02K 5/00*    (2006.01)
(52) U.S. Cl. ........................................... 310/91; 89/52
(58) Field of Classification Search .................. 310/89, 310/91, 52
See application file for complete search history.

(56) References Cited

U.S. PATENT DOCUMENTS

| | | | | |
|---|---|---|---|---|
| 4,337,406 | A | * | 6/1982 | Binder ........................ 310/91 |
| 5,936,326 | A | | 8/1999 | Umeda et al. |
| 5,952,749 | A | | 9/1999 | Umeda et al. |
| 5,955,810 | A | | 9/1999 | Umeda et al. |
| 5,965,965 | A | | 10/1999 | Umeda et al. |
| 5,982,068 | A | | 11/1999 | Umeda et al. |
| 5,986,375 | A | * | 11/1999 | Umeda et al. .............. 310/180 |
| 5,994,813 | A | | 11/1999 | Umeda et al. |
| 5,998,903 | A | | 12/1999 | Umeda et al. |
| 6,011,332 | A | | 1/2000 | Umeda et al. |
| 6,020,669 | A | | 2/2000 | Umeda et al. |
| 6,051,906 | A | | 4/2000 | Umeda et al. |
| 6,091,169 | A | | 7/2000 | Umeda et al. |
| 6,097,130 | A | | 8/2000 | Umeda et al. |
| 6,124,660 | A | | 9/2000 | Umeda et al. |
| 6,137,201 | A | | 10/2000 | Umeda et al. |
| 6,144,136 | A | | 11/2000 | Umeda et al. |
| 6,181,043 | B1 | | 1/2001 | Kusase et al. |
| 6,181,045 | B1 | | 1/2001 | Umeda et al. |
| 6,198,190 | B1 | * | 3/2001 | Umeda et al. .............. 310/179 |
| 6,291,918 | B1 | | 9/2001 | Umeda et al. |

(Continued)

FOREIGN PATENT DOCUMENTS

JP    08-331786 A    12/1996

(Continued)

*Primary Examiner*—Thanh Lam
(74) *Attorney, Agent, or Firm*—Oliff & Berridge, PLC

(57) ABSTRACT

An alternator is composed of a frame, a rotor rotatably supported in the frame, a stator contained in the frame outside the rotor and other associated components. A front end of the alternator is directly mounted on a mounting surface of an engine having a fairly large size, and a front end of a rotor shaft is directly connected to an engine shaft. The frame includes inlet windows for introducing cooling air into the alternator and outlet windows for exhausting the cooling air after cooling a stator coil and other components in the alternator. The inlet and outlet windows are positioned so that cool air is always introduced into the alternator, preventing hot air once exhausted from the alternator from staying between an engine bracket and the inlet windows and being sucked again into the alternator. Further, the outlet windows are positioned at a radial outside of a front coil end of a stator winding, so that the front coil end is fully exposed to the cooling air.

4 Claims, 4 Drawing Sheets

U.S. PATENT DOCUMENTS

| | | |
|---|---|---|
| 6,459,186 B1 * | 10/2002 | Umeda et al. ............... 310/208 |
| 6,876,113 B1 * | 4/2005 | Harris ........................ 310/114 |
| 2003/0117033 A1 * | 6/2003 | Even et al. .................. 310/180 |
| 2003/0151316 A1 * | 8/2003 | Vasilescu ..................... 310/64 |
| 2004/0100808 A1 * | 5/2004 | Braun et al. ................. 363/144 |

FOREIGN PATENT DOCUMENTS

| | | |
|---|---|---|
| JP | 2002-058193 A | 2/2002 |
| JP | 3407643 B2 | 3/2003 |

* cited by examiner

FRONT SIDE ← → REAR SIDE

ALTERNATOR DIRECTLY CONNECTED TO ENGINE

CROSS-REFERENCE TO RELATED APPLICATION

This application is based upon and claims benefit of priority of Japanese Patent Application No. 2004-326064 filed on Nov. 10, 2004, the content of which is incorporated herein by reference.

BACKGROUND OF THE INVENTION

1. Field of the Invention

The present invention relates to an alternator that is directly connected to an internal combustion engine, such as an alternator for use in a motorcycle.

2. Description of Related Art

Most of alternators for use in a four-wheel automobile are driven by an engine by a driving belt connecting an alternator pulley and a driving shaft of the engine, as exemplified in JP-A-2002-58193. In this case, air for cooling the alternator can be easily taken into the alternator and exhausted from the alternator without interfering with a bracket of the engine. Accordingly, the alternator is sufficiently cooled by the cooling air. In order to further improve cooling efficiency, it has been proposed to use conductor segments, as exemplified in JP-B2-3407643.

Some other alternators, such as alternators for use in a motorcycle, are directly connected to an engine and directly driven by the engine without using a pulley and a driving belt, as exemplified in JP-A-8-331786. In this case, a hot airflow exhausted from the alternator after cooling the alternator is hindered by an engine bracket that is closely located to the alternator. Accordingly, the hot air may be taken again into the alternator, and the alternator may not be sufficiently cooled.

SUMMARY OF THE INVENTION

The present invention has been made to improve cooling efficiency in an alternator directly connected to an engine, and an object of the present invention is to provide such an alternator that is effectively cooled.

The alternator is composed of a frame, a rotor rotatably supported in the frame, a stator contained in the frame outside the rotor and associated components. A front flange of the frame is connected to an engine bracket, and a front end of the rotor shaft is directly connected to an engine shaft so that the rotor is directly driven by the engine. The frame includes cooling air inlet windows and cooling air outlet windows. Cooling air is introduced from the cooling air inlet windows into the alternator by a cooling fan driven together with the rotor, and is blown out of the cooling air outlet windows.

The cooling air inlet windows are formed in the front axial end of the frame, and the cooling air outlet windows are formed at an radial outside of the frame, so that hot cooling air once exhausted does not stay or stagnate around the cooling air inlet windows even if the engine bracket to which the alternator is connected has a fairly large surface. In this manner, cool air is always introduced into the alternator through the cooling air inlet windows, and a high cooling efficiency is realized. Further, the cooling air outlet windows are positioned directly outside of a front coil end to lead the cooling air in the radial direction to the front coil end. The front coil end formed by plural conductor segments is shaped to have air passages through which the cooling air flows to further enhance the cooling efficiency.

Preferably, a front end surface of each cooling air outlet window is positioned at a same position as a front end of the front coil end in order to minimize an amount of cooling air flowing through without passing the front coil end. A rear end surface of each cooling air outlet window is sloped toward the rear side of the alternator so that the cooling air flowing out of the outlet window is directed away from the front side, i.e., away from the engine. Further, the front end surface of the outlet window may be made perpendicular to the axial direction of the rotor shaft so that the exhausted cooling air is not directed to the engine side.

According to the present invention, the hot cooling air exhausted from the outlet windows is prevented from stagnating around the inlet windows and from being introduced again into the alternator. Most of the cooling air flowing in the radial direction hits the front coil end of the stator winding. Therefore, cooling efficiency in the alternator is considerably improved. Other objects and features of the present invention will become more readily apparent from a better understanding of the preferred embodiment described below with reference to the following drawings.

DETAILED DESCRIPTION OF THE PREFERRED EMBODIMENT

Figure 1:
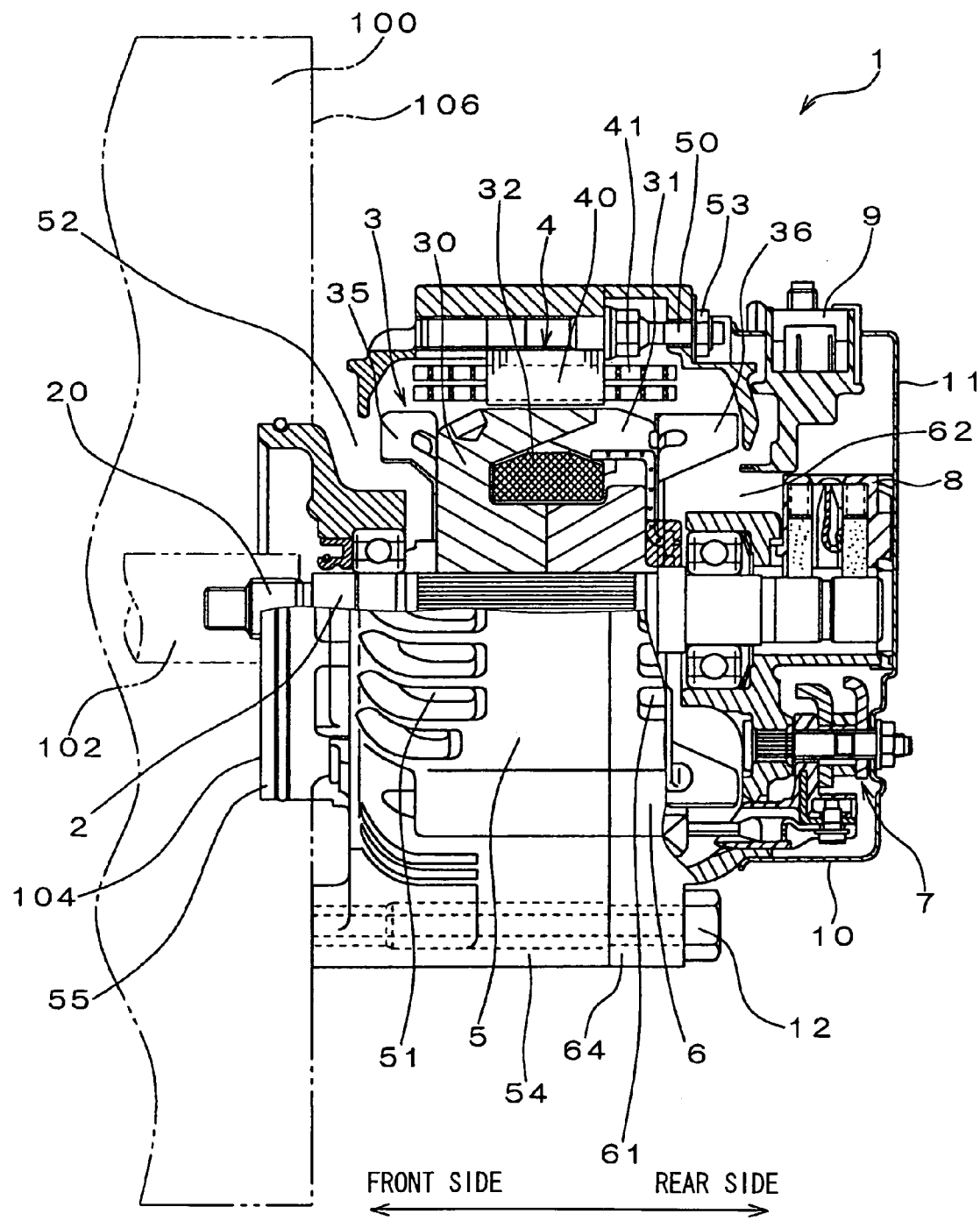
FIG. 1 is a cross-sectional view showing an entire structure of an alternator according to the present invention.

A preferred embodiment of the present invention will be described with reference to FIGS. 1-6. As shown in FIG. 1, an alternator 1 is directly connected to an engine bracket 100 and directly driven by the engine. The alternator 1 is composed of a rotor shaft 2, a rotor 3, a stator 4, a frame composed of a front frame 5 and a rear frame 6, a rectifier 7, a brush device 8, a voltage regulator 9 and other associated components. The front side of the alternator is the left side of FIG. 1 and the rear side is the right side, as indicated in FIG. 1.

An outer spline 20 formed at the front end of the rotor shaft 2 is coupled to an inner spline 102 formed in an engine shaft, and thereby the alternator 1 is directly driven by the engine without using a pulley and a driving belt. The rotor 3 generating a magnetic field is composed of a pair of pole cores, a front pole core 30 and a rear pole core 31 firmly connected to the rotor shaft 2, and a rotor winding 32 wound around the pole cores. Each rotor core 30, 31 has a boss portion connected to the rotor shaft 2 and plural claw-shaped poles (e.g., 6 poles). A cooling fan 35 is connected to a front surface of the front pole core 30 by welding or the like so that the cooling fan 35 rotates together with the rotor 3.

The cooling fan 35 is a fan having inclined blades for blowing air in both directions, an axial direction parallel to the rotor shaft 2 and a radial direction perpendicular to the rotor shaft 2. The cooling air flowing in the axial direction goes through spaces between the poles of the pole cores 30, 31 and an air gap between the rotor 3 and the stator 4, and thereby the rotor 3 and the stator 4 are cooled. Another cooling fan 36 is connected to a rear surface of the rear pole core 31. The cooling fan 36 is a centrifugal fan having upright blades for blowing air in the radial direction.

Figure 2:
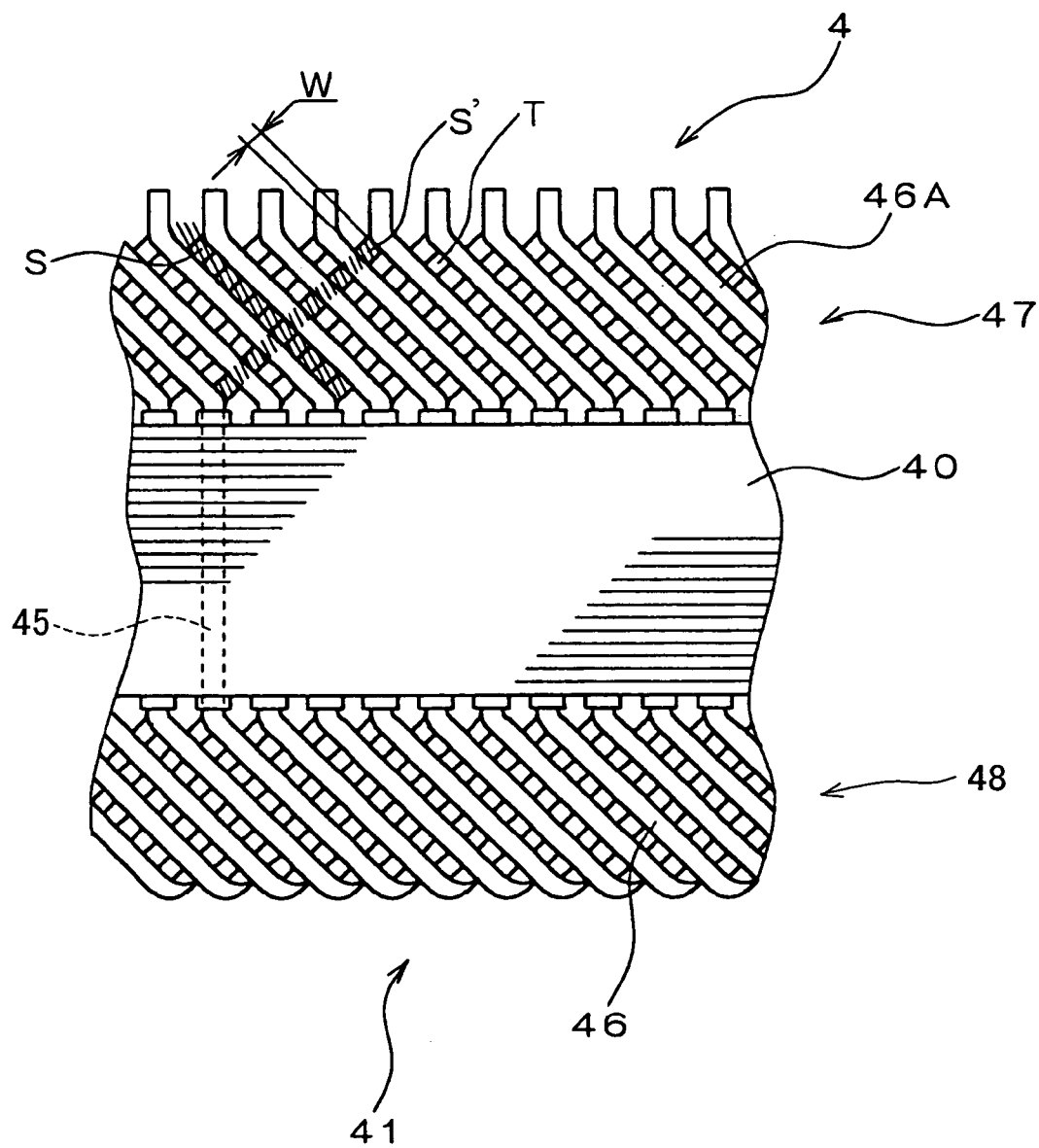
FIG. 2 is a flattened view showing part of a stator having a stator winding, viewed from an outside of the stator.
Figure 3:
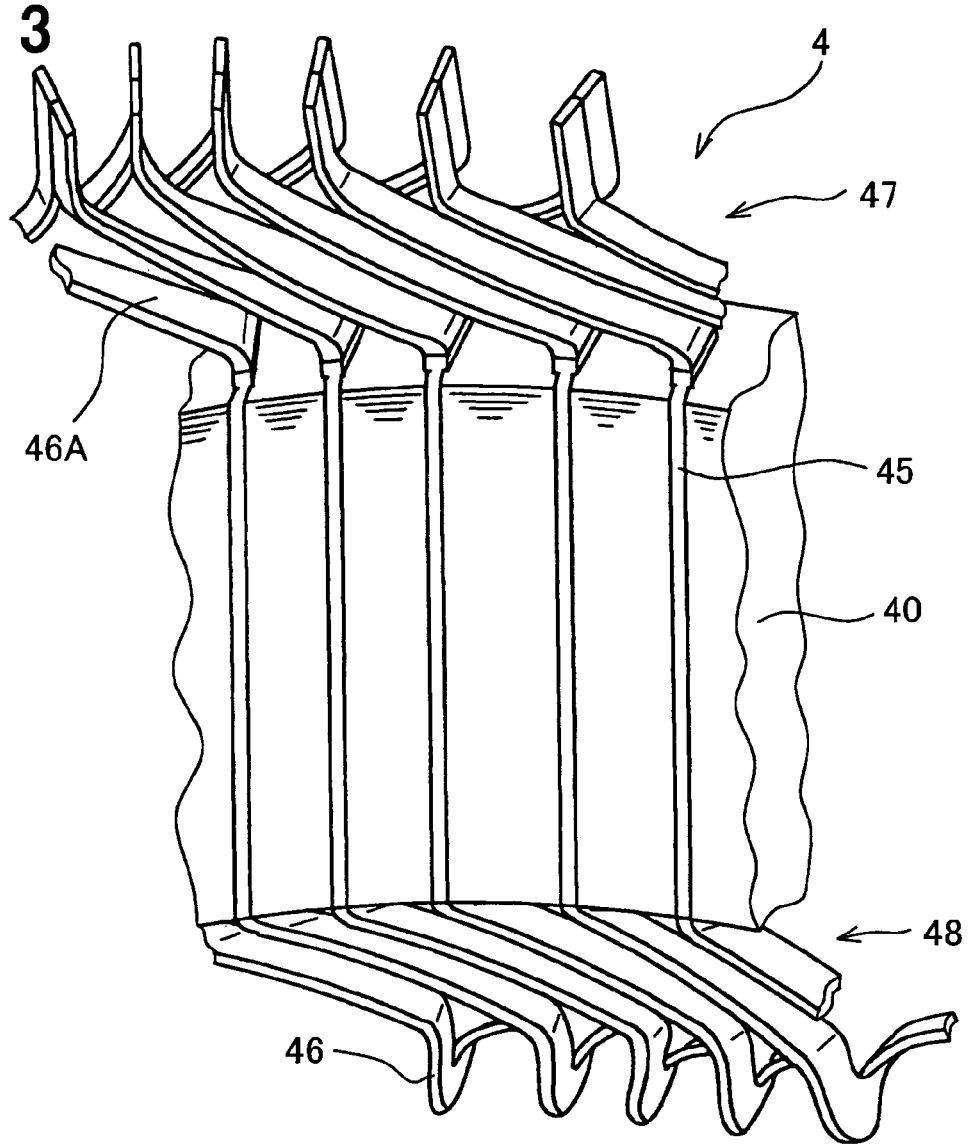
FIG. 3 is a perspective view showing a front coil end of the stator winding.

The stator 4 is composed of a cylindrical stator core 40 having plural slots 45 (shown in FIGS. 2 and 3) and a stator winding 41. The stator winding 41 is composed of plural U-shaped conductor segments 46 disposed in the slots 45 and electrically connected to one another. As shown in FIG. 3, several U-shaped conductor segments 46 are disposed in each slot, forming several layers in each slot 45. Portions 46A of the conductor segments 46 led out from the slots 45 to the front side and electrically connected to one another form a front coil end 47. Portions of the conductor segments 46 led out from the slot 45 to the rear side form a rear coil end 48. The conductor segments 46 led out from the one layer level (the same layer level) are bent in a radial direction with the same inclination angle as shown in FIGS. 2 and 3. The conductor segments led out from another layer level next to the one layer level are bent in an opposite radial direction with the same inclination angle.

As shown in FIG. 2, a uniform gap W is formed between neighboring conductor segments 46A led out from the same layer level in each slot. In other words, an elongate space S is formed between conductor segments 46A neighboring along the circumferential direction of the stator core 40. Similarly, an elongate space S' is formed between conductor segments 46A neighboring in the radial direction of the stator core 40. Both elongate spaces S, S' cross each other forming plural square gaps T.

The stator 4 is contained in a frame composed of a front frame 5 and the rear frame 6, and the stator 4 is connected to the frame with stud bolts 50 and nuts 53. The rotor 3 is rotatably supported in the frame inside the stator 4. The front frame 5 has cooling air outlet windows 51 formed around the front coil end 47 of the stator winding 41 and cooling air inlet windows 52 formed at an axial end of the front frame 5. Cooling air is sucked into the alternator from the cooling air inlet windows 52 by the cooling fan 35, flows through the inside space of the alternator in both axial and radial directions, and flows out of the cooling air outlet windows 51. A positional relation between the front coil end 47 and the cooling air outlet windows 51 will be described later in detail.

The rectifier 7, the brush device 8 and the voltage regulator 9 are disposed outside of the axial end of the rear frame 6, and covered with a rear cover 10. The rear frame 6 has cooling air outlet windows 61 formed around the rear coil end 48 and cooling air inlet windows 62 formed at the rear axial end of the rear frame 6. The rear cover 10 also has cooling air inlet windows 11 formed in its rear end surface. Cooling air is sucked into the alternator from the cooling air inlet windows 11 by the cooling fan 36, and flows through the cooling air inlet windows 62 after cooling the components disposed outside the rear frame 6, such as the rectifier 7. The cooling air introduced into the rear frame 6 through the cooling air inlet windows 62 flows out of the cooling air outlet windows 61 through the rear coil end 48. That is, the cooling air introduced in the axial direction is blown out in the radial direction.

The front frame 5 and the rear frame 6 have respective stays 54, 64 each having a through-hole. Bolts 12 are inserted into the through-holes of the stays 54, 64 and screwed into the engine bracket 100, thereby fixedly connecting the alternator 1 to the engine. A front flange 55 having a cylindrical shape is connected to a depressed portion 104 formed on the engine bracket 100. The outer spline 20 of the rotor shaft 2 is connected to the inner spline 102 of the engine shaft to thereby drive the rotor 3 by the engine. The engine bracket 100 has a mounting surface 106 which is wider than the outer diameter of the cooling air outlet windows 51. In other words, the mounting surface 106 stretches beyond the outer periphery of the cooling air outlet windows 51.

Figure 4:
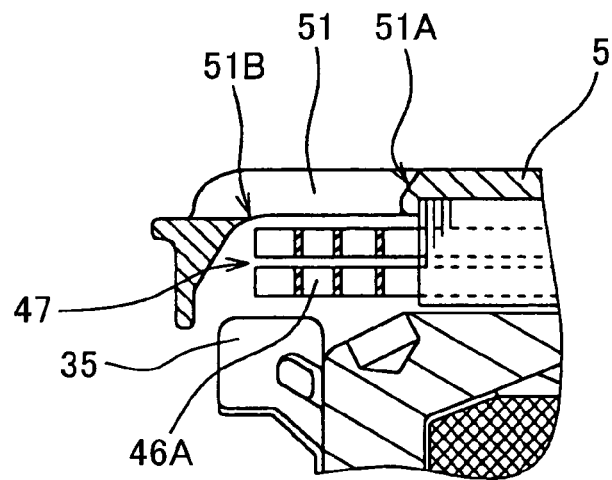
FIG. 4 is a partial cross-sectional view showing a vicinity of the front coil end and a cooling air outlet window.

Now, referring to FIG. 4, a positional relation between the front coil end 47 and the cooling air outlet windows 51 will be described. A rear end surface 51A of the cooling air outlet window 51 is sloped toward the rear side. Accordingly, cooling air flowing out through the cooling air outlet window 51 flows along the sloped surface 51A toward the rear side (away from the engine frame 100). A front end 51B of the cooling air outlet window 51 is positioned at a substantially equal position as an front end of the front coil end 47 is positioned. Accordingly, most of the airflow blown by the cooling fan 35 flows through the gaps T (explained above) because there is substantially no passage between the front coil end 47 and the front end 51B of the cooling air outlet window 51. In this manner, the front coil end 47 can be sufficiently cooled.

Figure 5:
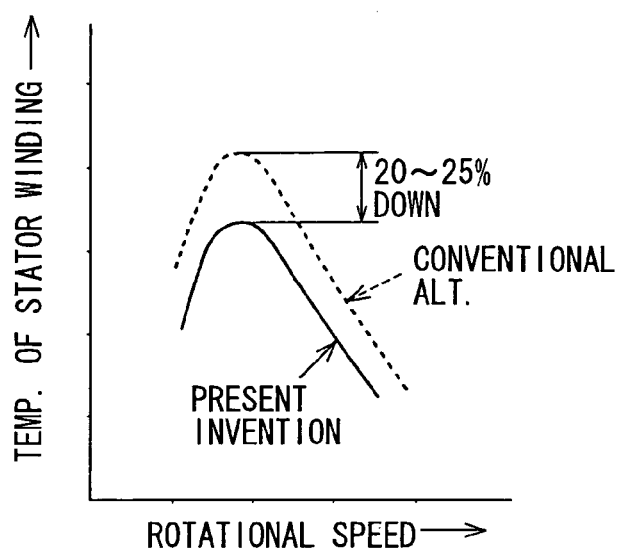
FIG. 5 is a graph showing an improvement in cooling efficiency in an alternator according to the present invention.
Figure 6:
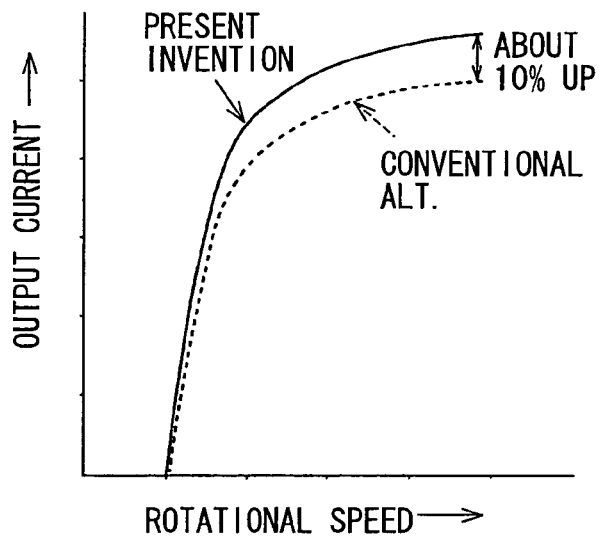
FIG. 6 is a graph showing an improvement in output of an alternator according to the present invention.

Improvement of the cooling efficiency attained in the present invention is shown in FIG. 5. Temperature of the stator winding 41 is shown on the ordinate and rotational speed of the alternator 1 on the abscissa. A solid line in the graph shows the stator winding temperature in the embodiment of the present invention, and a dotted line shows the same in the conventional alternator shown in JP-A-8-331786 (mentioned in the background section in this specification). As seen in the graph, the temperature is lowered by 20-25% according to the present invention. FIG. 6 shows improvement in the output according to the present invention. An output current is shown on the ordinate and rotational speed on the abscissa. A solid line shows the output current of the alternator of the present invention, while a dotted line shows that of the conventional alternator. As shown in the graph, the output is increased by about 10% by improving the cooling efficiency according to the present invention.

Advantages attained in the present invention will be summarized below. Since the square gaps T are formed in the front coil end 47 by bending conductor segments with a uniform angle, the cooling air in the radial direction flows through the square gaps T thereby sufficiently cooling the front coil end 47. Since the front end 51B of the cooling air outlet window 51 is positioned at the substantially same position as the end of the front coil end 47, most of the cooling air flows through the front coil end 47 and an amount of cooling air blown out through the space between the front coil end 47 and the front end 51B is minimized. Since the rear end surface 51A of the cooling air outlet window 51 is sloped toward the rear side, the cooling air blown out of the cooling air outlet window 51 is directed toward the rear side.

Because of the above-mentioned effects, the hot cooling air blown out of the outlet windows 51 does not stagnate or stay around the cooling air inlet windows 52. Therefore, it is surely avoided that the exhausted hot air is sucked again into the alternator 1 even if the bracket 100 facing the front frame 5 has a large surface. Accordingly, the cooling efficiency is considerably improved according to the present invention.

Figure 7:
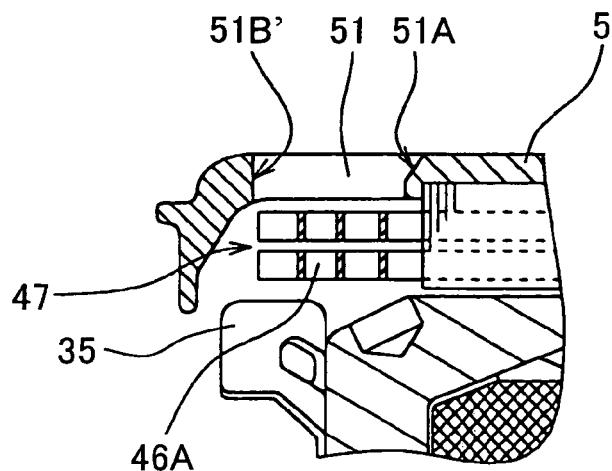
FIG. 7 is a partial cross-sectional view showing a vicinity of the front coil end and a cooling air outlet window, as a modified form.

The present invention is not limited to the embodiment described above, but it may be variously modified. For example, the front end surface 51B of the cooling air outlet window 51, which is parallel to the axial direction in the foregoing embodiment, may be modified to a surface 51B' which is perpendicular to the axial direction, as shown in FIG. 7. By making the front surface 51B' perpendicular to the axial direction, an amount of air blown out of the cooling air outlet window 51 toward the front side is further reduced.

While the present invention has been shown and described with reference to the foregoing preferred embodiment, it will be apparent to those skilled in the art that changes in form and detail may be made therein without departing from the scope of the invention as defined in the appended claims.

What is claimed is:

1. An alternator comprising:
    a rotor having a rotor shaft directly connected to an engine to be driven by the engine;
    a cooling fan connected to a front axial end of the rotor;
    a stator disposed outside of the rotor; and
    a frame for rotatably supporting the rotor and for fixedly holding the stator therein, wherein:
    the stator comprises a cylindrical stator core having a plurality of slots and a stator winding formed with a plurality of conductor segments and disposed in the slots, several conductor segments being disposed in each slot to form several layers therein, a portion of conductor segments led out from the slots forming a front coil end, conductor segments led out from a same level layer in the slots being bent in a circumferential direction of the stator core with a substantially equal inclination forming substantially uniform gaps between neighboring conductor segments; and
    the frame includes cooling air outlet windows formed at a radial outside of the front coil end and cooling air inlet windows formed at an axial front end of the frame facing the engine, so that cooling air taken into the alternator from the cooling air inlet windows by the cooling fan flows out of the cooling air outlet windows through the gaps between the neighboring conductor segments in a direction away from the engine, and
    a rear end surface of the cooling air outlet windows is sloped toward the rear side so that the cooling air flowing out of the cooling air outlet windows is directed away from the engine.

2. The alternator as in claim 1, wherein:
    the frame of the alternator includes a front flange, the front flange being fixedly connected to a mounting surface of the engine, the mounting surface being larger than an outer diameter of the frame where the outlet windows are formed.

3. The alternator as in claim 1, wherein:
    a front end of the front coil end is positioned at a substantially same position as a front end of the air outlet window.

4. The alternator as in claim 1, wherein:
    a front end surface of the cooling air outlet window is formed to be perpendicular to the axial direction of the rotor shaft.

* * * * *